Oct. 29, 1963    G. A. WESTMONT    3,108,481
FORWARD AND REVERSE BELT DRIVE
Filed June 13, 1960    3 Sheets-Sheet 1
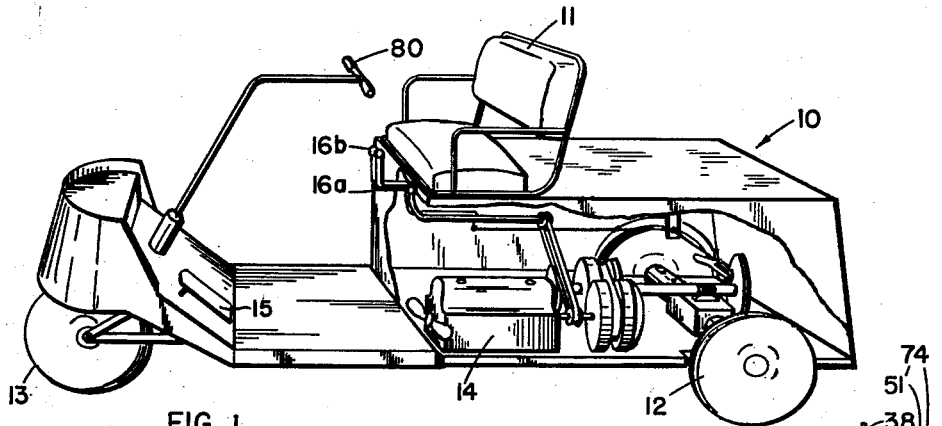
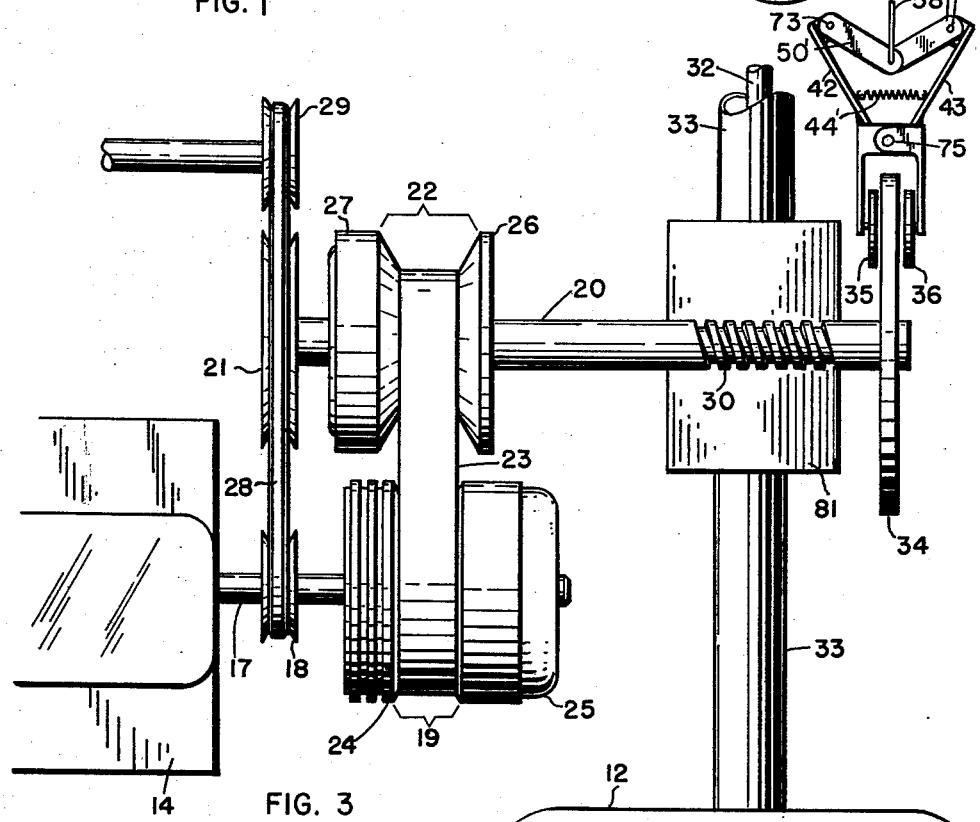
INVENTOR
GEORGE A. WESTMONT
BY
ATTORNEY Oct. 29, 1963 G. A. WESTMONT 3,108,481
FORWARD AND REVERSE BELT DRIVE
Filed June 13, 1960 3 Sheets-Sheet 2
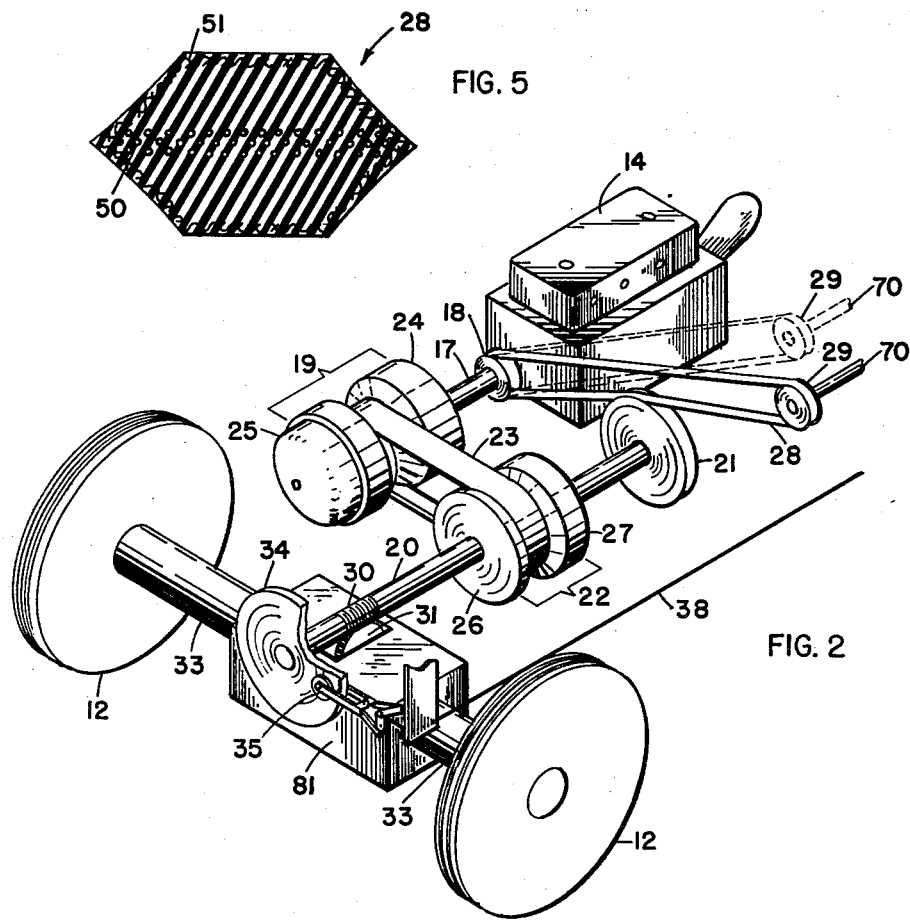
INVENTOR
GEORGE A. WESTMONT
BY
ATTORNEY Oct. 29, 1963
G. A. WESTMONT
3,108,481
FORWARD AND REVERSE BELT DRIVE
Filed June 13, 1960
3 Sheets-Sheet 3
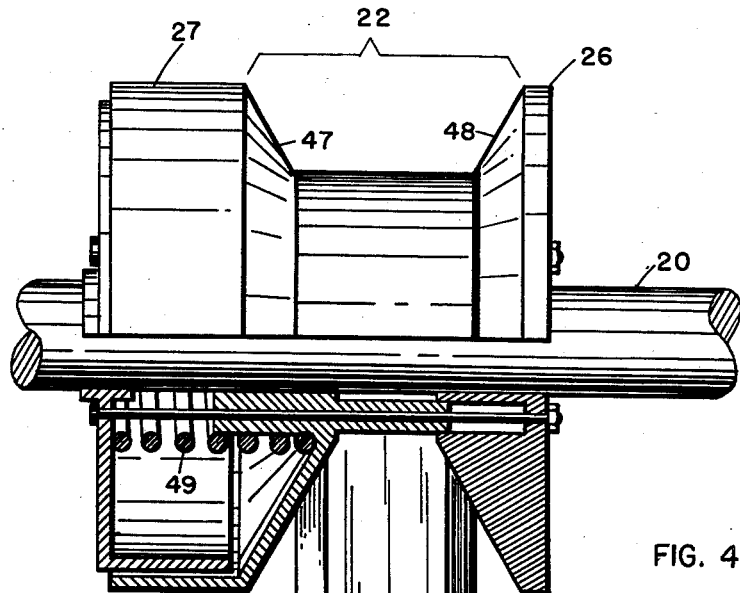
FIG. 4
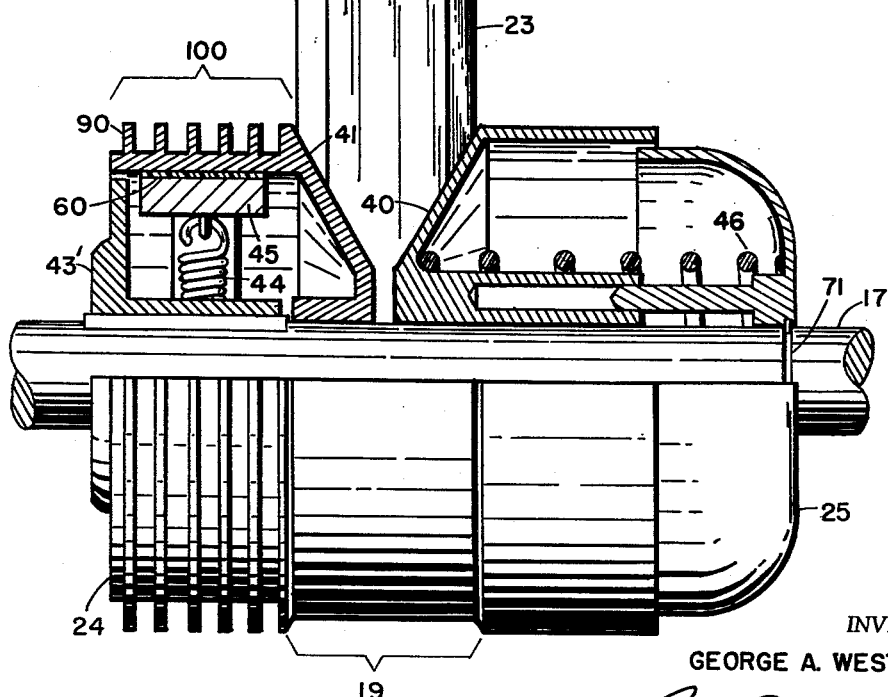
INVENTOR
GEORGE A. WESTMONT
BY
ATTORNEY

United States Patent Office 3,108,481
Patented Oct. 29, 1963

3,108,481
FORWARD AND REVERSE BELT DRIVE
George A. Westmont, 3008 Waunona Way, Madison, Wis.
Filed June 13, 1960, Ser. No. 35,515
2 Claims. (Cl. 74—229)

This invention relates to a new and novel drive and brake means for effecting forward and reverse movement of such motor vehicles as golf carts, small farm equipment or the like. This invention may be used in sea vehicles as well as land vehicles.

A primary objection to the present brake and drive means of small motor driven vehicles is their undue complexity which makes these vehicles unduly cumbersome and inefficient.

A further objection to the present drive and brake means is encountered in golf buggies where careless treatment has resulted in stripping the gears of these vehicles. Many people who use these carts rent them rather than own them and thus are negligent in their operation. Their careless treatment is effected especially in shifting gears. Many people do not stop going forward before they shift into reverse gear, thus causing stripping of the gears which quickly wears down the transmission system of these carts.

An object of this invention is to provide an improved forward and reverse drive and brake means which will automatically stop forward motion and then provide reverse motion once shifting into reverse is effected.

Another object is to provide a driving arrangement for motor vehicles which will lower construction costs of motor vehicles.

Another object is to provide a greatly simplified forward and reverse driving and braking arrangement.

Another object is to provide an improved reversing mechanism for motor vehicles.

Another object of this invention is to provide an improved braking system.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is a perspective partially cutaway side view of a motor vehicle utilizing the novel drive and braking arrangement of the invention;

FIGURE 2 is a perspective elevated view of the drive means of this invention;

FIGURE 3 is a plan view of the drive and brake means of this invention;

FIGURE 4 is an enlarged partially cutaway plan view of a portion of the drive and brake means of FIGURE 3;

FIGURE 5 is an enlarged transverse section through a hexagonal belt utilized in the invention.

Referring now to FIGURE 1, reference numeral 10 indicates generally the frame portion of a golf buggy or the like which is provided with a seat 11 in the center of the buggy, two rear wheels 12, a front wheel 13 and a steering member 80. The vehicle incorporates an engine 14, which may be any suitable type of internal combustion engine such as a piston engine or turbine engine delivering power to run the buggy. The buggy may be equipped with an accelerator pedal 15 which is attached to the floor of the vehicle and two levers 16a and 16b, 16a being a lever for braking and automatic shifting from forward to reverse or vice-versa and lever 16b being used for applying the emergency brake.

Referring now more specifically to FIGURES 2 and 3 which illustrate the improved drive means in detail, it will be seen that engine 14 rotates drive shaft 17 which carries a pair of pulleys 18 and 19. Pulley 19 may be a conventional V-belt pulley having a trapezoidal or V-shaped groove. Pulley 18 is rigidly secured to shaft 17 so as to rotate with shaft 17. Parallel to shaft 17 is a driven shaft 20, which carries two pulleys 21 and 22 both rigidly secured to shaft 20 so as to be able to rotate with shaft 20. Pulley 22 may be a conventional V-belt pulley having a trapezoidal or V-shaped groove. Pulley 19 is connected to pulley 22 by V-belt 23. Said V-belt is trained around the half sheaves 24, 25, 26, and 27 of the respective pulleys 19 and 22.

Belt 28 is trained over pulley 18 and movable idler pulley 29. Shaft 70 which carries idler pulley 29 is connected to the shift lever 16a by means not shown so that the idler pulley may be positioned as shown by the full lines at 29 during the backward movement of the vehicle. Thus belt 28 may be out of contact with the pulley 21 during the forward movement of the vehicle as shown by the dotted lines at 29.

When it is desired to stop the forward movement of the vehicle or cause it to move in reverse, shaft 70 may be moved to the position shown by the full lines in FIGURE 2, by operation of lever 16a, so that pulley 29 is lowered and the bottom outer portion of belt 28 contacts pulley 21.

Belt 28 may be of V or hexagonal construction as shown in FIGURE 5 may have a uniform cross-sectional area throughout its entire length with the cross section resembling two truncated isosceles triangles. As illustrated in FIGURE 5, the belt consists of a number of layers forming a group of cords 50 longitudinally throughout the length of the belt, this layer of cords constituting a substantially inextensible strength-imparting core. Located on the inner and outer side of the group of cords 50 are several layers of fabric 51. Belts of this type are especially efficient if a driven member is to be rotated in the same direction as a driving member and another driven member is to be rotated in the opposite direction from the driving member by the same belt. Sufficient wedging driving contact with the grooves of pulleys 18 and 21 is produced so as to substantially eliminate slippage and to effectively rotate the pulleys 18 and 21 in reverse or opposite directions. While the preferred construction of belt 28 is shown in FIGURE 5 and described above, belt 28 may be of any suitable construction; such other constructions may include flat belts, round belts or the normal V-belts.

Referring back to FIGURE 3, it will be seen, that driven shaft 20 carries a worm 30 meshing with a pinion 31. Rotation of shaft 20 causes worm 30 to rotate; worm gear 30 drives worm pinion 31 which is the ring gear of a differential, not shown, contained in a differential housing 81. Wheel axles 32, enclosed in axle housing 33, are driven by this differential; the wheel axles in turn drive wheels 12.

Rigidly attached to driven shaft 20 is a circular disc 34 which rotates as shaft 20 rotates. Braking may be applied to the vehicle by a set of discs 35 and 36 which frictionally engage disc 34 whenever member 38 (see FIGURE 2) is pulled by the driver. Member 38 which may be a cord, rod, cable or the like, may be attached by means of a pivot pin to two links 40 and 41 which are hingedly fastened at their other ends with pins 73 and 74 to arms 42 and 43. Arms 42 and 43 may be biased inwardly toward each other by tension spring 44' extending in between them, being hingedly attached together by pin 75. When pressure is placed on them by links 50' and 51' as a result of tension being exerted on member 38, arms 42 and 43 force together discs 35 and 36 which are respectively attached to the arms. Hence when brake lever 16b (see FIGURE 1) is pulled by the driver, tension will be exerted on member 38, causing the discs 35 and 36 to clamp on the circular disc 34, thus applying braking action to the vehicle.

The worm gear 30 and pinion 31 have a self locking tendency; thus when engine 14 is stopped, they tend to act as a brake by reason of their tendency to automatically lock so that shaft 20 will not be rotated by the wheels 12. It is a well-known principle of a worm gear drive that the greater the self locking power of the gear and pinion, the less will be the efficiency of the drive as a power transmitter during the starting and forward operation of the vehicle. Hence by the use of the braking system described above, the need for providing a worm gear drive of a high self locking power is reduced. Thus one can use in the drive system of this invention a worm gear drive of high efficiency as a power transmitter in the starting and forward operation of the vehicle. Because of the tendency of the worm gear drive toward the self-locking effect, it is necessary as part of this invention to provide very little braking force to the worm gear shaft 20 to prevent its rotation and thereby prevent rotation of the wheels, even when a high torque is applied to the wheels, as when the vehicle is parked on a very steep hill.

Referring to FIGURE 4 which is an enlarged top view of the main drive assembly utilizing two V-belt pulleys, the drive shaft 17 carries a pulley or sheave 19 which comprises a pair of flanges 40 and 41 forming an expandable grooved pulley or sheave and a clutch generally indicated as 100. Directly attached to flange 41 is an outer housing 90 which carries clutch plate 60. A portion of pulley 19 is prevented from sliding longitudinally by means of a collar 71. The inner portion of clutch 100 comprises an inner member 43' directly attached to shaft 17; member 43' carries a spring housing enclosing a weight 45 and tension spring 44 connected to the housing and the weight 45, to urge the weight toward the center. Since the weight 45 is connected to shaft 17 by tension spring 44 and member 43', it is rotated with the shaft 17. Upon rotation of the shaft 17, weight 45 moves outwardly by reason of centrifugal force elongating spring 44 and causing contact between weight 45 and clutch plate 60, whereupon shaft 17 is engaged with flange 41 and thus with pulley 19. When the clutch 100 is disengaged, the drive shaft 17 will rotate freely and no longer drive pulley 19.

Flange 41, which is freely rotatable with respect to shaft 17, is not movable along the shaft, while flange 40 is slidable but not rotatable on shaft 17. Spring 46 urges flange 40 toward flange 41 so as to vary the effective diameter of the pulley. V-belt 23 is trained around pulley 19 and pulley 22 which comprises two flanges 47 and 48 carried by shaft 20, flange 48 being fixed to shaft 20 and flange 47 being slidable but not rotatable on the shaft. A spring 49 urges flange 47 toward flange 48 to counteract the separating action exerted by the V-belt 23 and to provide for variation of the effective diameter of the pulley. The effective diameter ratio of pulleys 22 and 19 varies depending upon the load on shaft 20 transmitted from the wheels by worm gear 30 and pinion 31. Thus when the load is high, as when the vehicle is climbing a hill, the ratio of the effective diameters will be such that greater torque will be transmitted and the vehicle will be driven at low speed; when the load is low, the ratio of effective diameters is such that the vehicle is driven at greater speed but with lower torque.

The manner of operation of the invention is as follows:

Rotation of drive shaft 17 rotates pulley 19 (this occurs only when the rotational speed is high enough to cause clutch 100 to engage) which rotates pulley 22 by means of belt 23. Because of the load torque transmitted by worm 30 through belt 23 to shaft 17, the flanges 40 and 41 tend to move apart against the compressive force exerted by spring 46 and the resulting variation in the effective diameter of the pulley 19 results in loosening of belt 23 on pulley 22 so that spring 49 urges flanges 47 and 48 together thus increasing the effective diameter of pulley 19. Spring 49 may be compressively biased to exert lesser force during rotative operation in well known manner by means of centrifugally responsive weighted means linked thereto, not shown, thereby producing variable separation of the flanges as a function of rotative speed. Thus a high drive ratio is provided to overcome initial inertia of the vehicle. As the vehicle gets underway, the load on the drive system may be replaced, whereupon the effective diameters of pulleys 19 and 22 are automatically changed so that the drive ratio is reduced.

When it is desired to cause the vehicle to stop or travel in reverse, shift lever 16a may be moved by the operator to move pulley 29 into the position indicated by the full lines in FIGURE 2 so that belt 28 contacts pulley 21. The friction between belt 28 and pulley 21, which are traveling in opposite directions at their area of contact, causes the rotational speed of drive shaft 17 to be reduced to such an extent that centrifugal clutch 100 becomes disengaged. Thereupon, pulleys 19 and 22 are stopped from rotating by the action of belt 28 on pulley 21 and the vehicle is consequently brought to a stop. The engine may be shut off at this time and if this is done, it may be seen that belt 28 will have served as a brake, operating on shaft 20 and may continue to so operate, as long as pulley 29 remains in the lower position. However, if it is desired to cause the vehicle to move in reverse, the engine is allowed to remain in operation and belt 28 operates pulley 29 to drive shaft 20 in the direction opposite to that in which it is driven by belt 23; consequently the wheels are driven in reverse direction through worm 30, pinion 31 and the differential.

At such time as it is then desired to stop the vehicle, braking force may be applied by placing tension on member 38 to thereby urge members 35 and 36 against disc 34. The same braking means may be utilized in similar manner as an emergency brake to stop the vehicle when it is moving forwardly. Alternatively, belt 28 may be disengaged from pulley 29 and the engine may be speeded up to cause clutch 100 to engage whereupon belt 23 acts on pulley 22 to cause shaft 20 to cease turning in the reverse direction and to turn in the forward direction. If the engine is stopped at the time shaft 20 ceases turning in the reverse direction, the vehicle will have been effectively braked.

When the vehicle has been brought to a stop, and it is desired to cause it to remain at rest, braking action may be applied to shaft 20 to augment the near-self-locking action of the worm end pinion, by either causing belt 28 to contact pulley 29 or by urging members 35 and 36 against disc 34 or both. Thus two separate braking means are available at all times to apply a braking force to the vehicle.

From the foregoing description it can be seen that in accordance with this invention, there may be utilized any one of many different arrangements of the various elements of the driving and braking mechanism of the invention. For example, shafts 17 and 20 may be positioned vertically or on a slope, rather than horizontally as shown. The worm gear 30 may be positioned at any suitable place on driven shaft 20 and need not be at the end of shaft 20 as shown. The motor may be placed to drive shaft 17 between pulleys 18 and 19 or may be placed to drive shaft 17 next to pulley 19 rather than next to pulley 18 as shown. Any conventional braking means for shaft 20 may be used in place of the disc brake comprising members 34, 35 and 36 and may be located at any suitable place on shaft 20, for example between worm 30 and pulley 22.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. A power train for a motor driven vehicle comprising in combination a drive shaft, a driving pulley comprising centrifugal clutch means affixed to said drive shaft, said pulley being engaged by means of said clutch to rotate with said shaft at speeds greater than motor idle speed, a pulley fixed on said drive shaft, a driven shaft, a driven pulley mounted on said driven shaft, belt means operably connecting said driven pulley, and said driving pulley, a pulley fixed on the driven shaft, a manually biasable idler pulley disposed to be moved in a plane with said two fixed pulleys, power transmission belt means operably connecting said pulley fixed on said drive shaft and said idler pulley and disposable against said pulley fixed on said driven shaft by operable biasing of said idler pulley so as to load said drive shaft to cause it to slow in rotation until said centrifugal clutch means disengages and to oppositely rotate said driven shaft relative to said drive shaft after said clutch disengages.

2. The article of claim 1 wherein said power transmission belt means is configurated with V cross-sectional portions on both the inside and outside surfaces.

References Cited in the file of this patent

UNITED STATES PATENTS

| | | |
|---|---|---|
| 1,236,749 | Osser | Aug. 14, 1917 |
| 2,477,065 | Kuert et al. | July 26, 1949 |
| 2,519,590 | Mitchell | Aug. 22, 1950 |
| 2,678,566 | Oehrli | May 18, 1954 |
| 2,911,193 | Wilson | Nov. 3, 1959 |